United States Patent

Farrell et al.

[11] 4,214,156
[45] Jul. 22, 1980

[54] GYRODYNAMIC FIXTURE FOR MEASURING THRUST FORCE COMPONENTS

[75] Inventors: John W. Farrell, Dallas, Tex.; Jere L. Andrews, Huntsville, Ala.

[73] Assignee: The United States of America as represented by the Secretary of the Army, Washington, D.C.

[21] Appl. No.: 972,303

[22] Filed: Dec. 22, 1978

[51] Int. Cl.² .............................................. G01D 5/34
[52] U.S. Cl. .............................. 250/231 SE; 73/116; 356/154
[58] Field of Search ............... 250/231 SE; 356/138, 356/152, 154; 73/116

[56] References Cited

U.S. PATENT DOCUMENTS 3,137,531  6/1964  Herrmann et al.

Primary Examiner—David C. Nelms
Assistant Examiner—Darwin R. Hostetter
Attorney, Agent, or Firm—William G. Gapcynski; Werten F. W. Bellamy; Harold W. Hilton

[57] ABSTRACT

Apparatus for measuring rocket motor thrust components and resolving small vector alignment errors. Apparatus includes a spherical air bearing which embodies gyrodynamic principles in order to provide three degrees of angular freedom and in order to achieve stiff, vibration free reactions against translational movement. Effects of thrust misalignment are seen as changes in angular rate which can be measured by encoding rotations of the floated rocket motor inner bearing assembly by use of built-in sensors and/or by motion with an external optical tracker.

4 Claims, 4 Drawing Figures

GYRODYNAMIC FIXTURE FOR MEASURING THRUST FORCE COMPONENTS

BACKGROUND OF THE INVENTION

In conventional testing of small or micro-rocket motor thrusters, the motor is attached to a support sting which is instrumented to measure forces in three dimensions. The largest force component is aligned with the geometric axis of the nozzle and is easily measured. However, force components along the two orthogonal axes caused by gas dynamics and nozzle misalignment are small and difficult to measure. Forces applied to a spinning body of known gyrodynamic characteristics will cause measurable changes in body motion. By mounting a thruster/motor on a spinning body which is free to rotate about transverse axes so that the major thrust force is directed through the spinning body center of gravity, thrust misalignment results in spinning body coning. The coning magnitude can be translated into magnitude and direction of misalignment forces.

SUMMARY OF THE INVENTION

Apparatus for measuring the pitch and yaw angular impulses due to maneuver motor thrust misalignment while subjected to a predetermined spin environment. The motor assembly is comprised of a substantially cylindrical casing having a plurality of nozzles disposed around the center thereof. Each nozzle is disposed in communication with a tubular propellant container extending substantially the length of the cylindrical casing. The motor casing is mounted on an air bearing, spun about the cylindrical axis, and the propellant in each propellant container is ignited in predetermined sequence. Optical measurement of the cylindrical body coning motion resulting from propellant exhaust gas dynamics and nozzle misalignment is accomplished by measuring an image locus on a screen produced by reflection of a collimated light beam off a mirror fixed on the test vehicle. Photoelectric measurement of spin motion is also made. Data is recorded on magnetic tape for data retrieval and correlation.

DESCRIPTION OF THE PREFERRED EMBODIMENT

Figure 1:
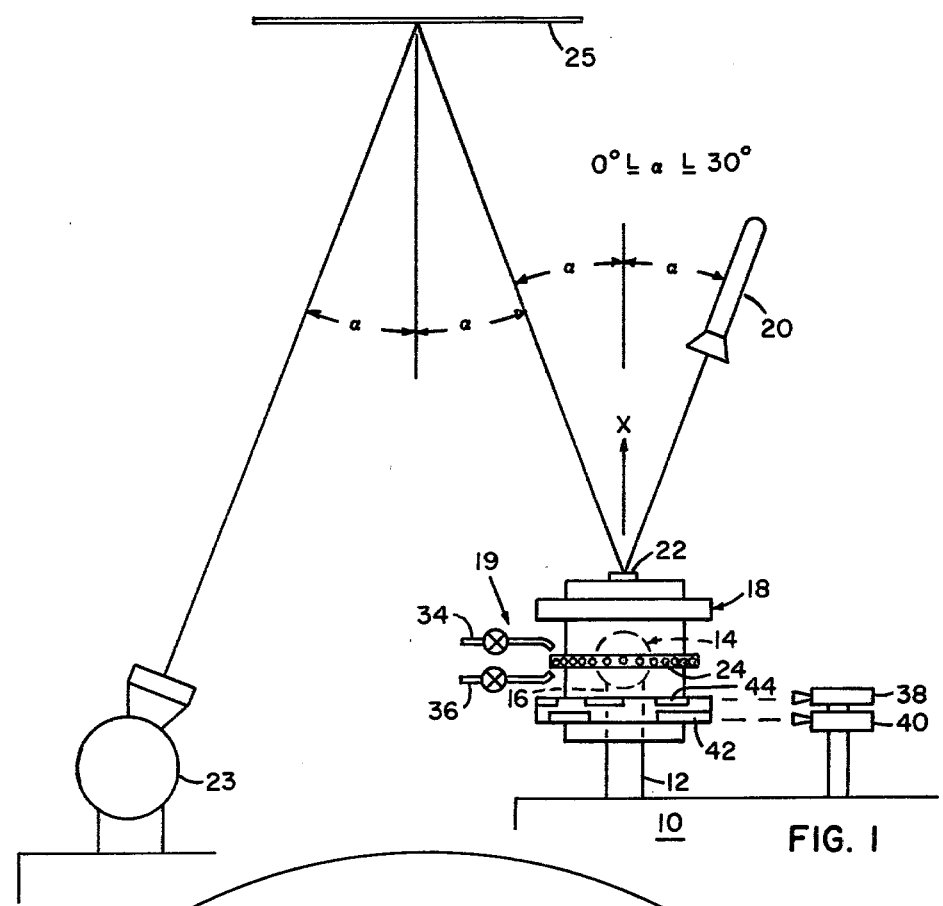
FIG. 1 is a diagrammatic view of the test setup using apparatus of the present invention.

As seen in FIG. 1, the test setup includes a support 10 having a sting 12 extending upwardly therefrom and an air bearing assembly 14 disposed on the distal end 16 of the sting. A rocket motor assembly 18 is mounted on the air bearing assembly. A source of spin-up air 19 is provided for initial spin up of the motor.

A high intensity collimated light source 20, such as a laser, is disposed in spaced relation above the upper end of the motor to direct the light source to a mirror 22 mounted on top of the motor. A screen 25 is spaced above the mirror to receive the reflected beam and an electro optical tracker 23 is used to measure the locus of the image on the screen.

Figure 3:
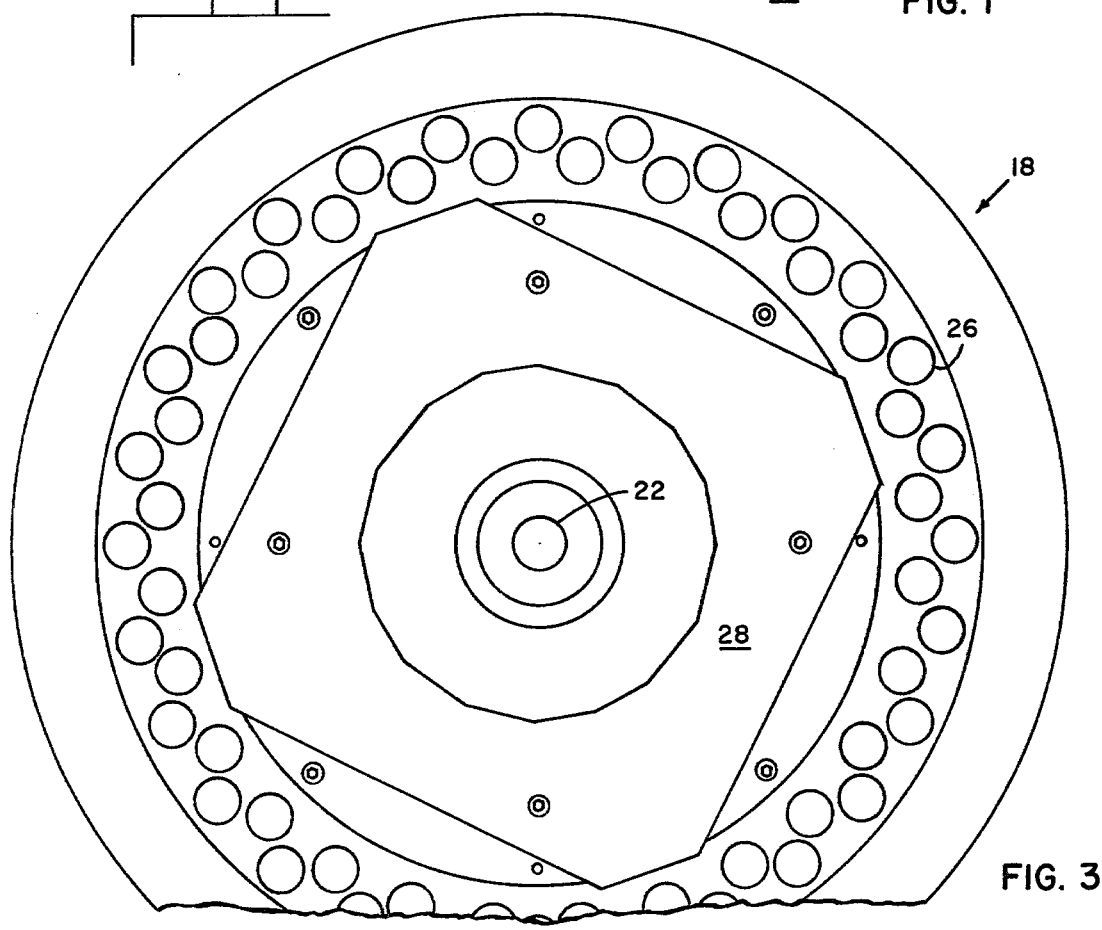
FIG. 3 is a view of the motor along lines 3—3 of FIG. 2.
Figure 2:
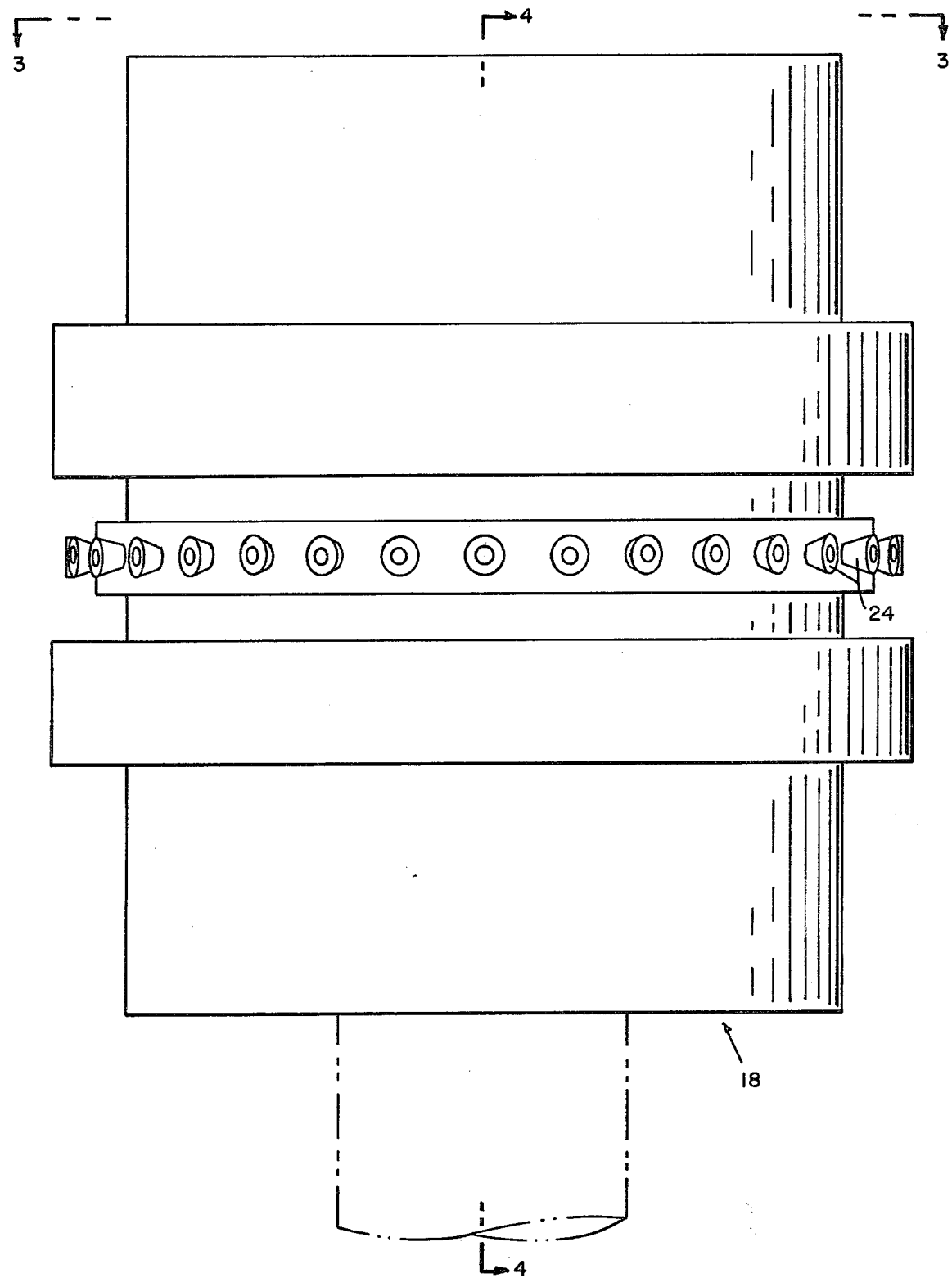
FIG. 2 is an elevational view of a typical motor as used in the test setup.
Figure 4:
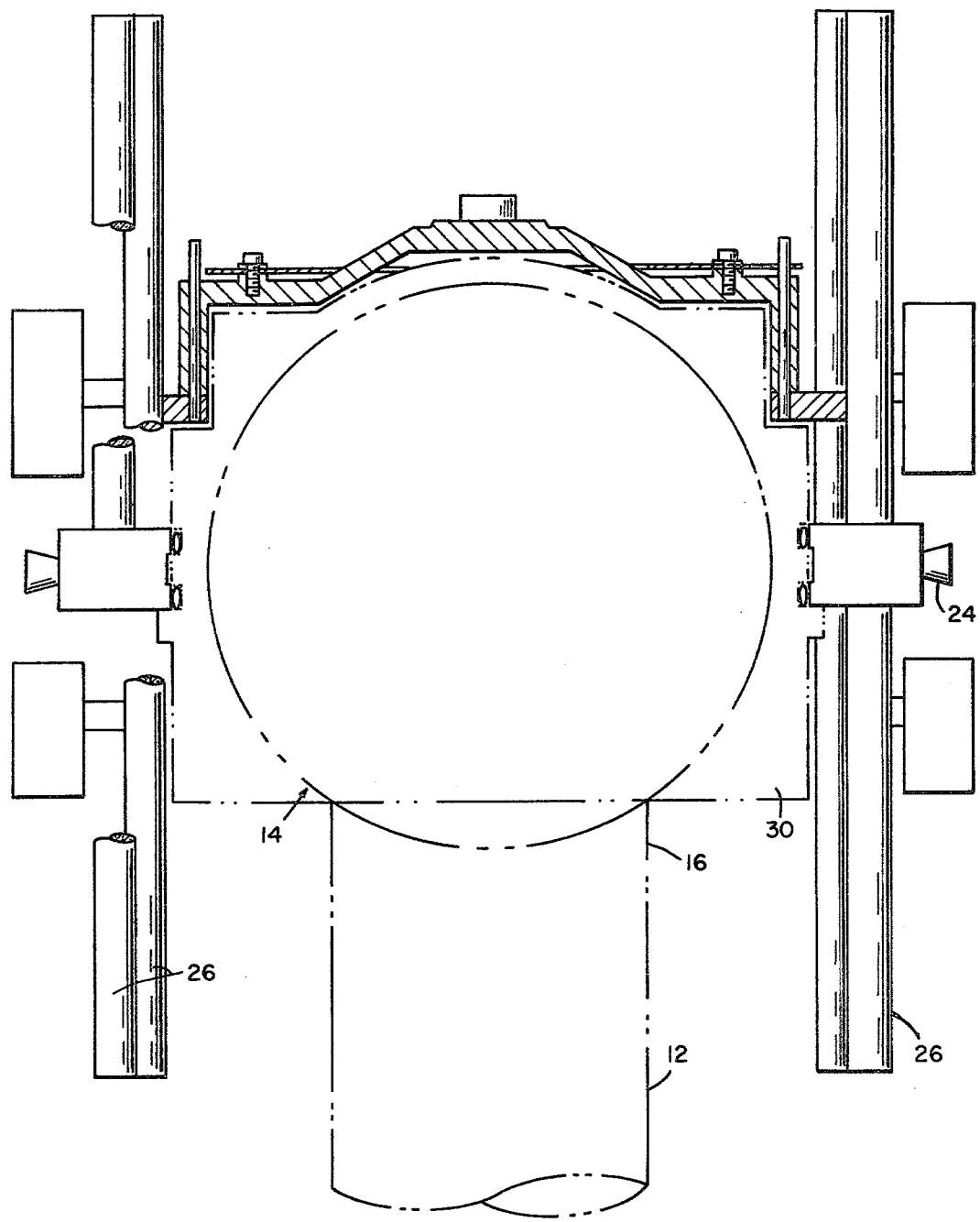
FIG. 4 is a sectional view along lines 4—4 of FIG. 3.

As seen in FIG. 2, motor assembly 18 is substantially cylindrical in shape with a plurality of nozzles 24 disposed about the periphery of the motor in communication with a propellant tube or chamber 26 (FIGS. 3, 4 and 5).

FIG. 3 illustrates the motor assembly 18 and the ends of the propellant chambers 26. Mirror 22 is shown mounted on the top 28 of the motor.

Air bearing assembly 14 is shown inside motor assembly 18 in FIG. 4. The motor assembly 18 includes a housing 30 having the nozzle assemblies 24 secured thereto. The tubular propellant containers are secured to the side of housing 30.

Air bearing assemblies are known in the art, such as that disclosed in U.S. Pat. No. 3,137,531 issued to A. L. Herrmann et al, June 16, 1964. In the present application the air bearing includes an outer rotating race and an inner stationary race mounted on sting 12. The bearing allows unrestricted coning motion of five degrees (half angle) measured from the nominal spin axis.

Spin-up mechanism 19 (FIG. 1) is provided for initial spin-up. The spin-up mechanism includes an air turbine principle using shop air and is comprised of two separately throttled nozzles 34 and 36 providing air jets at opposite faces of the nozzle ring assembly 24 acting as the turbine at the same angular location. The separate throttling allows for adjustment of the caging position for control of initial spin conditions. A common air supply and a single shut off valve is required to insure simultaneous shut off.

The primary test data is generated by the high intensity collimated light source 20 reflecting off front surface mirror 22 fixed on the upper surface of the motor onto a screen located a predetermined distance and angle above the mirror. The electro optical tracker 23 measures the trajectory of the image. The image on the screen will appear to the tracker as moving in an approximate circle at 25 rps.

Two photoelectric spin monitors 38 and 40 provide spin rate and angular position data to identify motor firing angles. The vehicle portion of this spin monitor link will consist of two sets of alternating dark and light bands 42 and 44 for sensing by the photoelectric cells. One set of bands will consist of 28 equally spaced bands (14 light to dark transitions) for motor identification and motor firing control. The second set of bands consist of 12 equally spaced bands (6 dark to light transitions) for direct, real time spin rate control. Magnetic tape recordings are made of the digitized X and Y tracker 23 outputs, the photoelectric spin monitor 38 and 40 outputs, ignition pulses, synchronization words and a time signal for data correlation.

We claim:

1. A gyrodynamic fixture for measuring thrust force components of a rocket motor comprising:
    (a) an air bearing assembly for support of said motor;
    (b) spin-up means for providing initial spin-up of said rocket motor;
    (c) a mirror mounted orthogonal to the spin axis of said motor and on the surface of said motor;
    (d) a screen disposed in spaced relation with said mirror, the centerline of said screen being spaced from the centerline of said mirror;
    (e) a highly collimated light source spaced from said mirror for reflecting light therefrom to said screen; and
    (f) an electo optical tracker means for receiving the reflected light from said screen.

2. Apparatus as in claim 1 including means for monitoring spin rate and angular position data of said motor.

3. Apparatus as in claim 2 wherein said means for monitoring spin rate and angular position data includes two sets of alternating dark and light bands secured around said motor, and two photoelectric spin monitors for sensing said light bands.

4. Apparatus as in claim 3 wherein said spin-up means includes a pair of nozzles connected to a source of air for impingement of said air on said motor for spin up thereof.

* * * * *